T. T. PROSSER.
Boiler for Culinary Purposes.
No. 56,609. Patented July 24, 1866.
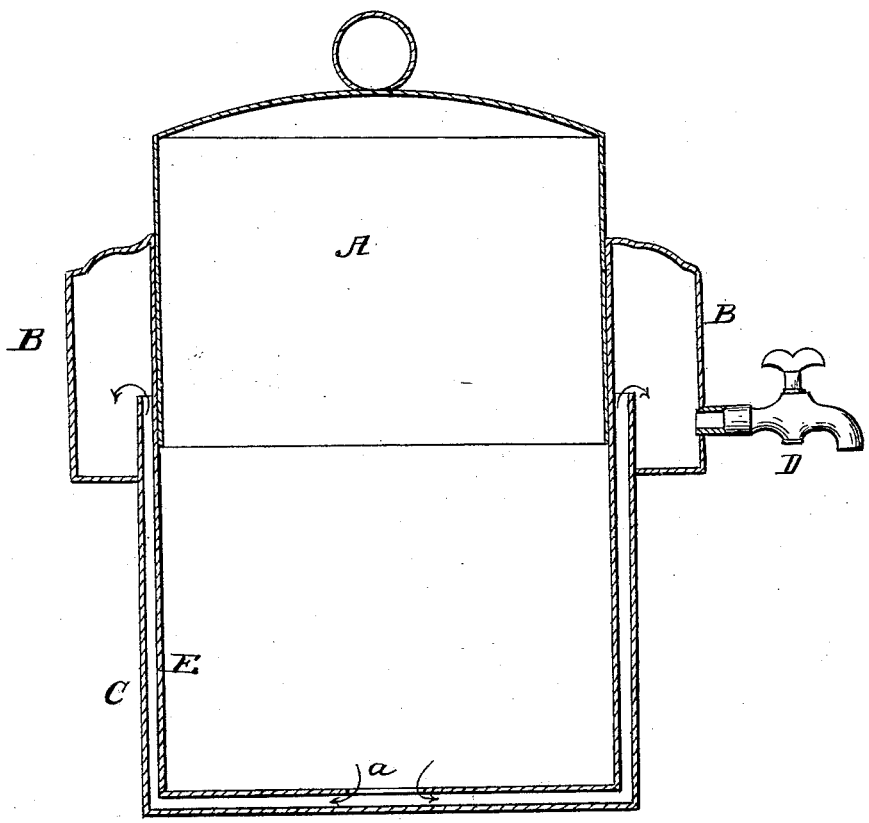
Witnesses:
P. P. Mast
P. T. Dodge
Inventor:
T. T. Prosser
By M. Dodge
Attorney

UNITED STATES PATENT OFFICE.

TREAT T. PROSSER, OF CHICAGO, ILLINOIS.

BOILER FOR CULINARY PURPOSES.

Specification forming part of Letters Patent No. 56,609, dated July 24, 1866.

*To all whom it may concern:*

Be it known that I, TREAT T. PROSSER, of the city of Chicago, in the county of Cook and State of Illinois, have invented a new and Improved Mode of Making Kettles; and I do hereby declare that the following is a full and exact description thereof, reference being had to the accompanying drawings, and to the letters of reference marked thereon, in which—

Figure 1 is a perspective view; Fig. 2, a longitudinal section, and Fig. 3 a section of the cover and barrel.

The nature of my invention consists in providing an inner case or lining to a kettle in such a manner as to form a thin chamber between the outside shell of the kettle and the inside case or lining, said chamber to connect with the inside or main part of the kettle by means of an opening or openings through the inner case or lining.

The object of this arrangement is to separate the hot water from the cold, thereby being able to draw hot water from the chamber long before the whole contents become heated.

To enable others skilled in the art to make and use my invention, I will proceed to describe its construction and operation.

The drawing represents a transverse vertical section of a kettle with my improvement applied.

I take, for instance, an ordinary tea-kettle, of which B may represent the upper portion, and C the lower portion, or that which usually enters the opening in the top of the stove. Within the kettle I secure a cylinder, E, which has its upper edge soldered or otherwise joined tightly to the top of the kettle around the edge of the opening in the top, the upper end of this cylinder E being left open to receive a cover of peculiar construction, hereinafter explained.

The cylinder E has a bottom secured to it, which has a small opening, *a*, at its center, as shown. This cylinder is made of such a size that when secured within the kettle, as shown in the drawings, there will be left between its exterior surface and the interior face or walls of the kettle a very narrow space, the upper portion of this narrow chamber in a kettle of this form opening into the larger chamber formed by the enlargement B of the kettle.

Instead of the ordinary spout, I attach a faucet, as shown at D, although this is not absolutely necessary.

It will be seen, Fig. 1, that the cover, instead of being made in the usual form and for the simple purpose of closing the vessel, is attached to a barrel or vertical ring fitted to the inner shell in such a manner as to be moved easily up and down therein to perform the important part of forcing the heated water out of the chamber through the faucet by means of the compressed air or steam confined in the cover. Were it not for the compressed air or steam confined in the cover it would be impossible to draw the water out of the vessel below the level of the faucet; but by this arrangement a large portion of the water can be forced out by simply forcing the cover downward. This arrangement of the cover also forms a safety-valve, so that the cover is lifted by the accumulation of steam, and thus permits the steam to pass out when its pressure exceeds the weight of the cover.

The operation of the kettle is performed in the following manner: The water or fluid to be heated is put into the kettle. A sufficient quantity passes through the aperture in the lining into the inner chamber and fills it to a corresponding level with the water in the inside of the kettle. The kettle being placed over the fire, the thin quantity of water in the chamber soon becomes heated, and consequently lighter. It is forced up into the chamber and cold water from the inside comes in to supply its place, which is in turn heated. Thus it will be seen that this arrangement effectually separates the hot water from the cold.

By opening the cock or faucet and pressing down the cover the hot water is made to run out through the faucet, and cold water is forced into the chamber to supply its place, which is in turn heated while passing through the chamber to the faucet, and thus becomes ready to be drawn off long before it would in an ordinary kettle.

Another important object is gained by my arrangement. It becomes unnecessary to lift the kettle to get out the water, but simply to open the faucet and press on the cover—a much easier and more desirable process.

It is obvious that my improvement may be applied to any form or style of kettle, and that it is not absolutely necessary to have the cylinder E and the kettle united at the top, as shown, though in kettles made of sheet metal, such as tin, copper, &c., that is the simplest and best form of constructing them. It also serves to prevent the steam from escaping at that point, and thereby prevents the evaporation of the water, and also helps to retain the heat that would otherwise be lost.

After thus fully describing the construction and operation of my invention, what I claim, and desire to secure by Letters Patent, is—

1. The shallow chamber C below, and connected with the inner and main chamber, E, by the opening $a$, and with the upper and exterior reservoir, B, substantially as and for the purpose set forth.

2. The combination and arrangement of the chambers and movable cover, for the purposes herein set forth.

TREAT T. PROSSER.

In presence of—
P. A. HOYNE,
W. C. DODGE.